(12) United States Patent
Ziskovsky et al.

(10) Patent No.: US 11,463,581 B1
(45) Date of Patent: Oct. 4, 2022

(54) MANAGING PHONE IDENTIFICATION VIA IMMUTABLE CONNECTION VERIFICATION

(71) Applicant: International Business Machines Corporation, Armonk, NY (US)

(72) Inventors: Joseph Michael Ziskovsky, Cottage Grove, MN (US); Natalie Brooks Powell, Bolingbrook, IL (US); Dennis Anthony Perpetua, Jr., Jay, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/319,702

(22) Filed: May 13, 2021

(51) Int. Cl.
*H04M 3/436* (2006.01)
*H04M 3/22* (2006.01)
*H04M 3/42* (2006.01)
*H04L 9/08* (2006.01)
*H04L 9/00* (2022.01)

(52) U.S. Cl.
CPC .......... *H04M 3/436* (2013.01); *H04L 9/0825* (2013.01); *H04L 9/0894* (2013.01); *H04M 3/2281* (2013.01); *H04M 3/42059* (2013.01); *H04L 9/50* (2022.05); *H04M 2203/2027* (2013.01); *H04M 2203/6027* (2013.01)

(58) Field of Classification Search
CPC ............... H04M 3/436; H04M 3/2281; H04M 3/42059; H04M 2203/2027; H04M 2203/6027; H04L 9/0825; H04L 9/0894; H04L 2209/38
USPC ..................................................... 379/142.05
See application file for complete search history.

(56) References Cited

U.S. PATENT DOCUMENTS

| 6,430,289 B1* | 8/2002 | Liffick | H04M 7/0033 379/900 |
| 9,942,410 B2 | 4/2018 | Wood | |
| 11,153,435 B2* | 10/2021 | Grabowski | H04W 4/70 |
| 2003/0072426 A1 | 4/2003 | Davidson | |
| 2003/0125059 A1* | 7/2003 | Collins | H04W 76/11 455/509 |
| 2005/0132060 A1* | 6/2005 | Mo | H04L 51/12 709/227 |
| 2005/0160259 A1* | 7/2005 | Ogura | H04L 9/00 713/156 |
| 2007/0190977 A1* | 8/2007 | Fok | H04W 12/069 455/411 |

(Continued)

FOREIGN PATENT DOCUMENTS

CN 109327627 A 2/2019

OTHER PUBLICATIONS

"Caller ID", Wikipedia, Last edited on Dec. 27, 2020, 15 pages, <https://en.wikipedia.org/wiki/Caller_ID>.

(Continued)

*Primary Examiner* — Binh Kien Tieu
(74) *Attorney, Agent, or Firm* — Brian M. Restauro

(57) ABSTRACT

Embodiments of the present invention provide methods, computer program products, and systems. Embodiments of the present invention can create an authentication mechanism for communication services utilizing a distributed recording system. Embodiments of the present invention can then, in response to receiving a request to connect with a device, utilize the created authentication mechanism to connect with or prevent connection with the device.

14 Claims, 4 Drawing Sheets

(56) References Cited

U.S. PATENT DOCUMENTS

| | | | | |
|---|---|---|---|---|
| 2013/0012165 | A1* | 1/2013 | Popovich | H04L 63/08 |
| | | | | 455/411 |
| 2017/0024740 | A1* | 1/2017 | Todasco | G06Q 20/382 |
| 2017/0163627 | A1* | 6/2017 | Keisala | H04W 12/069 |
| 2018/0287997 | A1* | 10/2018 | Li | H04L 61/4511 |
| 2020/0220725 | A1 | 7/2020 | Hudson | |
| 2020/0252503 | A1* | 8/2020 | Li | H04L 65/1079 |
| 2020/0304632 | A1 | 9/2020 | Johnson | |
| 2021/0058433 | A1* | 2/2021 | Fer | H04W 12/04 |
| 2021/0168238 | A1* | 6/2021 | Adolphe | H04W 12/12 |
| 2021/0273931 | A1* | 9/2021 | Murdoch | H04L 9/006 |
| 2021/0303646 | A1* | 9/2021 | Guntipalli | G06F 16/9535 |
| 2021/0360402 | A1* | 11/2021 | Powers | H04W 76/10 |
| 2021/0377112 | A1* | 12/2021 | Bartlett | H04L 67/306 |
| 2022/0021528 | A1* | 1/2022 | Dawson, III | H04L 9/3239 |
| 2022/0046126 | A1* | 2/2022 | Grabowski | H04M 3/436 |

OTHER PUBLICATIONS

"Certificate management for STIR/SHAKEN", TransNexus, Copyright © 2007-2021, 24 pages, <https://transnexus.com/whitepapers/stir-shaken-cms-solutions/>.

"Combating Spoofed Robocalls with Caller ID Authentication", FCC, Downloaded Feb. 17, 2021, 3 pages, <https://www.fcc.gov/call-authentication>.

"Managing Unsolicited Communication Leveraging STIR/SHAKEN and Blockchain", Tech Mahindra and IBM POV, Downloaded Feb. 17, 2021, 12 pages, <https://cache.techmahindra.com/static/img/pdf/unsolicited-communication-brocher.pdf>.

* cited by examiner

US 11,463,581 B1

MANAGING PHONE IDENTIFICATION VIA IMMUTABLE CONNECTION VERIFICATION

BACKGROUND

The present invention relates in general to telecommunication services and in particular to managing phone identification via immutable connection verification.

Telecommunication services typically involve construction or operation of telephones and systems for the transmission of speech or other sound between points, with or without the use of wires. These services generally include computer hardware, software, and computer network systems, that perform functions traditionally performed by telephone equipment. In this context the technology is specifically referred to as Internet telephony, or Voice over Internet Protocol (VoIP).

The steps and principles involved in originating VoIP telephone calls are similar to traditional digital telephony and involve signaling, channel setup, digitization of the analog voice signals, and encoding. Instead of being transmitted over a circuit-switched network, the digital information is packetized and transmission occurs as IP packets over a packet-switched network. They transport media streams using special media delivery protocols that encode audio and video with audio codecs and video codecs. Various codecs exist that optimize the media stream based on application requirements and network bandwidth; some implementations rely on narrowband and compressed speech, while others support high-fidelity stereo codecs.

A robocall is a phone call that uses a computerized auto-dialer to deliver a pre-recorded message, as if from a robot. Robocalls are often associated with political and telemarketing phone campaigns, but can also be used for public-service or emergency announcements. Some robocalls use personalized audio messages to simulate an actual personal phone call.

SUMMARY

According to an aspect of the present invention, there is provided a computer-implemented method. The computer implemented method comprises creating an authentication mechanism for communication services utilizing a distributed recording system; and in response to receiving a request to connect with a device, utilizing the created authentication mechanism to connect with or prevent connection with the device.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize limitations with respect to security and privacy mechanisms for Voice over Internet Protocol (VoIP). Specifically, embodiments of the present invention recognize that existing protections (e.g., the protocols rely on a handshake that is singular in time) do not prevent spoofed calls from outside of the country of a user, that is, protections do not prevent spoofed calls originating outside of United States. The limitation of this is that the handshake is one-time using a public key to generate a private key. There is no reporting structure to enable the receiving caller to identify a caller that has either managed to still spoof the system, or chose to block their callerID for the receiver, and for the identification (of the caller that has managed to spoof the system) to be stored.

Embodiments of the present invention solve this problem by augmenting privacy protections against call spoofing. For example, embodiments of the present invention manage call identifications and call connections, helping protect personal information while providing a registerable and immutable framework of data to combat the issue of robocalling and call spoofing (e.g., "spam-calling"). Specifically, embodiments of the present invention increase security by utilizing the immutable nature of blockchain at several levels. For example, using a private/public key combination at both ends of the call, embodiments of the present invention can effectively generate the equivalent of a "tracert" on the voice call, that is stored in the chain in an immutable manner. Additionally, in this manner, embodiments of the present invention can provide receivers of calls have the ability to immediately provide feedback on the legitimacy of a call. By using the private/public key combination, embodiments of the present invention can identify the origin of a call, identify trends/patterns to help providers globally combat the robocalling and call spoofing. Each receiver's private key would store such information that would be needed to help filter calls (e.g., accepting calls or blocking calls with no callerID enabled incoming, existence on a "do not call registry", etc.).

Figure 1:
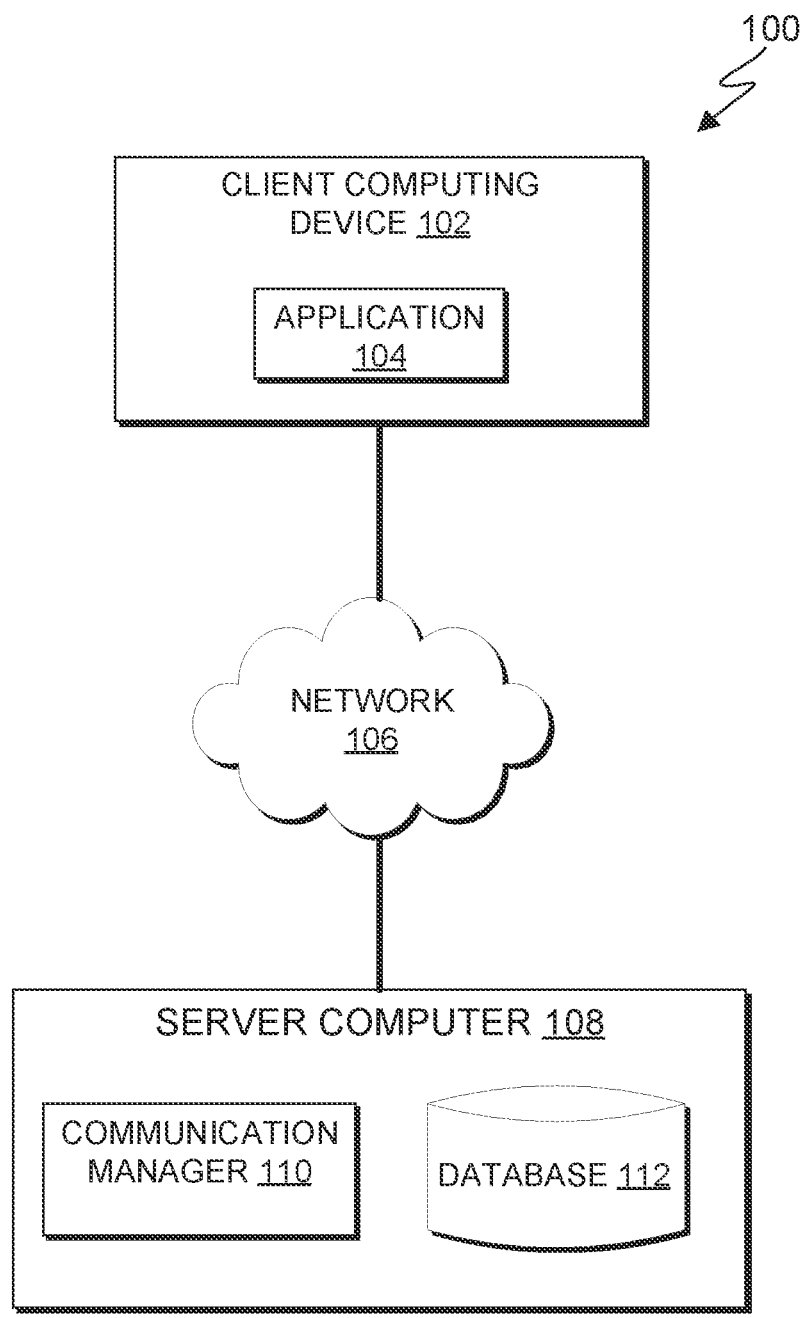
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access communication manager 110 (e.g., using TCP/IP) to access content, user information, and database information. Application 104 can further communicate with communication manager 110 to transmit instructions to manage call identification and call connections. Specifically, embodiments of the present invention increase security by utilizing the immutable nature of blockchain at several levels as discussed in greater detail with regard to FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts communication manager 110 and database 112. In this embodiment, communication manager 110 resides on server computer 108. In other embodiments, communication manager 110 can have an instance of the program (not shown) stored locally on client computer device 102. In other embodiments, communication manager 110 can be a standalone program or system dynamically adjusts auditory levels within an environment such that a user can have optimal sound quality (i.e., clarity and same level of measured loudness) at a location where there the user is listening. In yet other embodiments, communication manager 110 can be stored on any number or computing devices.

Communication manager 110 manages call identification and call connections. In general, communication manager 110 protects personal information while providing a registerable and immutable framework of data to combat the issue of robocalling and call spoofing (e.g., "spam-calling"). For example, communication manager 110 creates an authentication mechanism comprising an immutable chain for reduced latency and separation of a public chain and a separately created private vendor-user chain. In some embodiments, communication manager 110 can create the immutable chain while in other embodiments, communication manager 110 can leverage an existing record utilizing a distributed record keeping system as a foundation for truth verification. In this embodiment, a vendor can refer to an instance of a telecommunications service (e.g., VoIP) and can be used to send or receive a request to initiate communication (e.g., a call) between one or more devices (e.g., a sending device that initiates a call and a receiving device that receives the call) associated with respective users (e.g., a sending user and a receiving user).

In this embodiment, communication manager 110 creates an authentication mechanism by creating a unique private key for a registered receiver and a respective public key for the vendor. Communication manager 110 maintains the unique private keys for registered receivers as a private chain that exists between a vendor and their registered users. In this way, the private key information ensures it exists in an immutable manner between the delivery vendor (e.g., communication service) and the respective user. In other words, communication manager 110 provides a solution that retains information in the private key of the receiver and the public key of the vendor structure. Put another way, while public and private keys exist, as they do under STIR/SHAKEN between vendors to help secure and encrypt communications, but communication manager 110 provides an immutable chain for reduced latency and the separation of the public chain while maintaining key information in the private vendor-user chain while keeping the private key hidden.

In this embodiment, communication manager 110 enables a user (e.g., either a potential receiver or sender of communication) to establish criteria (e.g., communication frequency, caller ID preferences, solicitation purposes, specific lists that allow or do not allow communications (e.g., do not call), etc.) for the receiving vendor (e.g., a communications service) to use that are stored in this local private chain, protected from spoofing by any sender. Communication manager 110 can utilize this stored criterion for respective user preference filtering (e.g., profile filtering). For example, during setup for a service, a client registers their criteria for such items as no solicitation calls, allow lists (contacts list allowances), no incoming CallerID blocking and possibly more relevant information. Communications manager 110 can then store this information as part of the unique private key that is shared with the vendor (e.g., communication service.

In this embodiment, communication manager 110 maintains the created private key in at least two locations to establish the immutable chain ((e.g., a user must have at least one single receiver), but ultimately would exist on each connection point (e.g., device, VoIP hub, landline receiver) plus within the vendor's facility (e.g., physical on-prem or virtual/cloud-based)). Communication manager 110 thus, in at least some embodiments requires the created private key to be maintained on each connection point (e.g., device-based). In this instance, the receiving vendor (i.e., the service or device receiving the communication request to connect to an end user device) would verify whether the private key is valid for the device it is attempting to connect to. Communication manager 110 can continually update the created immutable chain with each respective logged communication request (e.g., a request and subsequent connected or not connected call). The created immutable chain can be accessed by sending vendors (i.e., vendors being used by a user wanting to place a call) which would all sending vendors to track their activity and provides a mechanism to allow sending vendors to comply with any local regulations as well as regional and global privacy compliance issues, while still ensuring the end receiver is protected.

In this embodiment, communication manager 110 utilizes existing or created public keys within a consensus-based block chain model. In this embodiment, these keys work in a functionally equivalent manner to the STIR/SHAKEN methodology such that the initial rollout of that solution would not inhibit the adoption of the proposed solution. For example, in this embodiment, communication manager 110 references the public key within the chain as part of the stored notation of a call, with each call that is accepted as a handshake between vendors.

Communication manager 110 can add and retain additional information to the chain such as call routing, known reports of usage, and more between vendors. For example, when a request to pass on a call is made, communication manager 110 references the public chain with regards to a sender's status within the chain. If the sender has been flagged, communication manager 110 refuses to complete or otherwise process the request. In this way, the call will not be accepted (or otherwise will be refused) by the receiving vendor. Communication manager 110 then notates the request, the incomplete (e.g., blocked) processing, and corresponding device.

On the sending side of the call, communication manager 110 can, in some embodiments, function as or otherwise leverage the processing (i.e., sending) vendor. For example, communication manager 110 can via the processing vendor have access to a private key combination with the sender to send all information in an encrypted manner, verifying the caller is registered with the correct private key before the sending vendor even begins to establish a connection with the receiving vendor. Communication manager 110 can also note this linkage as part of the initial communication between the vendors to the extent that the originating callers can be identified by the sending vendor to the receiving vendor as a safe (i.e., trusted) source and via encryption at least the following information that should be shared: country of origin of the call, and the registered number of the originating caller. In situations where vendors are used to help connect (e.g., fly-over vendors), the handoff would not be noted, ultimately ensuring that the receiving vendor (e.g., connecting to the final user) received the sending vendors original signal and caller information.

In this embodiment, communication manager 110 can manage or otherwise monitor and access receiving vendors for incoming connection requests. In other embodiments, the receiving vendors will monitor connection requests from source vendors. Communication manager 110 can use an Augmented Intelligence engine to sort and review incoming data packets among the incoming connection requests from a source vendor. In this way, connection manager 110 can identify and flag potential signs indicative of fraud (e.g., call spoofing, robocalling, etc.). For example, communication manager 110 can use the following to detect activity indicative of fraud: frequency of rate spikes, number of connection requests, increases in rate and frequency of number of unregistered (i.e., untrusted) user information, specific increases in rate and frequency from a single registered user, etc. In this embodiment either communication manager 110 or the receiving vendor can intercept such traffic and automatically block the connection for receiving users whose profile filter thresholds are not met. Additionally, communication manager 110 can notify the sending vendor and register that vendor within the chain as a potential source of call spoofing, robocalling, voice spam, etc. and reduce that vendor's validity (and therefore trust) in the public consensus chain.

Embodiments of communication manager 110 can also function on the receiving user's side. For example, communication manager 110 can provide a threshold period of time starting from when the request to communicate is received (e.g., within a set amount of time of five to ten seconds) to initiate to their receiving vendor (so as to initiate the call requested by the sending vendor) using a universal code (used in all counties and by all vendors) from the device on which the call was received. In other embodiments, communication manager 110 can generate a unique code specific to the receiving device (e.g., sent via text, email communication, etc.) to enter into the user interface of the receiving device to initiate the received call (e.g., the receiving vendor).

As mentioned above, communication manager 110 creates a reporting mechanism on a user interface displayed on the user device. In this embodiment, communication manager 110 creates a reporting mechanism that records user feedback. In this manner, communication manager 110 can (via user input) assign satisfaction values (e.g., user sentiment). In this embodiment, a numeric scale is used where greater numbers indicate higher levels of satisfaction while lesser number indicate lower levels of satisfaction (e.g., a satisfaction score of two on a scale from one to ten would indicate less satisfaction than a score of nine). In other embodiments, communication manager 110 can use a binary recording system recording either a positive or negative interaction. For example, a positive interaction denotes that the call successfully initiated, and that the interaction had was satisfied with the received and perhaps unexpected phone call upon completion. Conversely a negative interaction denotes that the user is unhappy or otherwise not satisfied because the user received an unsolicited and unwanted phone call.

Communication manager 110 can then feed the assigned satisfaction values through a machine learning/training loop with regards to the receiving feedback pertaining to reporting a call. In this embodiment, user satisfaction/sentiment is recorded autonomously and subsequently added to a reporting value for a reporting transaction. In this manner, connection manager 110 can iteratively learn whether the system was utilized for a user's positive or negative outcome. In some other embodiments, communication manager 110 can add the user satisfaction values to the record as part of the immutable chain thus providing an additional weighting factor.

Communication manager 110 can then register the recorded response (i.e., the interaction response from the user) with the receiving vendor. In other words, in this embodiment, the receiving vendor can register or otherwise notate the recorded response with the logged call and respective device that received logged call as part of a data block in the public chain thereby updating the public chain. The receiving vendor can further update the respective data block noting any possible flags (i.e., activity showing potential signs indicative of fraud) and share any possible flags back with the sending vendor. In this manner, communication manager 110 can also notate (i.e., record) the sending vendor as part of the data block in the public chain as either being trusted or not trusted (e.g., resulting a combination of the interaction response from the user and presence or absence of detected flags). In some embodiments, communication manager 110 can further incentivize sending vendors via the interaction response and public chain record. For example, communication manager 110 can leverage the designation of "not trusted" or "unsecure" to motivate sending venders to improve their respective validating procedures for outgoing connections.

In this embodiment, either communication manager 110 or the sending vendor could terminate or otherwise refuse to connect future calls between a specific sender (e.g., using a sending vendor) and receiver (e.g., using a specific receiving vendor) based at least in part on the created immutable chain. For example, communication manager 110 could set a threshold level of interaction response and presence or absence of detected flags. Specifically, communication manager could set a numerical threshold that, when reached, triggers a ban in service. In other words, communication manager 110 or the sending vendor could refuse to process a request (e.g., a call) if enough flags and/or negative sentiment are defined in the block and evidence for such a decision would be immutable and included in the chain.

Database 112 stores received information and can be representative of one or more databases that give permissioned access to communication manager 110 or publicly available databases. For example, database 112 can store the created immutable chain. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
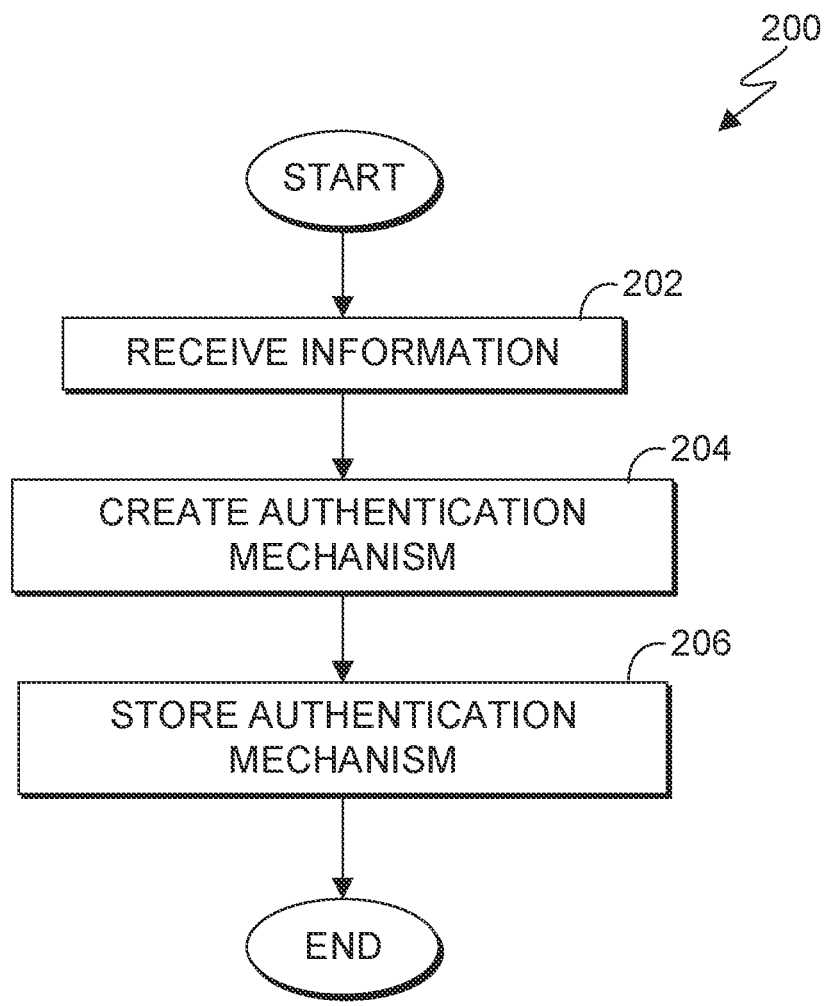
FIG. 2 is a flowchart depicting operational steps creating an authentication mechanism, in accordance with an embodiment of the present invention.

FIG. 2 is a flowchart 200 depicting operational steps creating an authentication mechanism, in accordance with an embodiment of the present invention.

In step 202, communication manager 110 receives information. In this embodiment, communication manager 110 receives a request from client computing device 102. In other embodiments, communication manager 110 can receive information from one or more other components of computing environment 100.

Information received by communication manager 110 can include requests to register for and informed consent to utilize services provided by communication manager 110. For example, communication manager 110 can receive a user request to register with communication manager 110. Information received by communication manager 110 can also include user preferences (referred to a user criteria). For example, user criteria can include communication frequency, caller ID preferences (such as no incoming CallerID blocking), prevent of communication for solicitation purposes, specific lists that allow or do not allow communications (e.g., do not call), etc.) for the receiving vendor (e.g., a communications service) to use that are stored in a local private chain (e.g., database 112).

In step 204, communication manager 110 creates an authentication mechanism. In this embodiment, communication manager 110 creates an authentication mechanism comprising respective private keys for each receiving vendor (e.g., a receiving vendor that connects to a respective user device that is receiving a call) that is used to access and log information in a distributed record keeping ledger. In this embodiment, communication manager 110 can generate respective private keys that can be used by vendors (e.g., both sending and receiving vendors) and establishes an immutable record that is updated with each received request to initiate a communication between vendors.

Communication manager 110 can utilize the received information for respective user preference filtering (e.g., profile filtering) when creating a private key for the respective user to use on the user's device and any receiving vendor the user accesses. For example, during setup for a service, a client can register criteria for such items as no solicitation calls, allow lists (contacts list allowances), no incoming CallerID blocking with communication manager 110. Communication manager 110 can then utilize this received information as part of a created data structure (e.g., a unique private key) that is shared with the vendor (e.g., communication service). In this embodiment, communication manager 110 can incorporate or otherwise reference the private key each time a request to connect to that specific user and update (or create a public record) record comprising communication requests, attempts, initiated connections, terminations (e.g., a distributed record keeping ledger for vendors) as discussed in greater detail with regard to FIG. 3. For example, the receiving vendor (i.e., the service or device receiving the communication request to connect to an end user device) would verify whether the private key is valid for the device it is attempting to connect to.

In step 206, communication manager 110 stores the created authentication mechanism. In this embodiment, communication manager 110 stored the created private key in at least two locations to establish the immutable chain ((e.g., a user must have at least one single receiver). Preferably, the created private key, exists on each connection point (e.g., device, VoIP hub, landline receiver) plus within the vendor's facility (e.g., physical on-premises or virtual/cloud-based)). Communication manager 110 can then continually update the created immutable chain with each respective logged communication request (e.g., a request and subsequent connected or not connected call) which would allow sending vendors (i.e., vendors being used by a user wanting to place a call) to comply with privacy regulations as discussed in greater detail with respect to FIG. 3.

Figure 3:
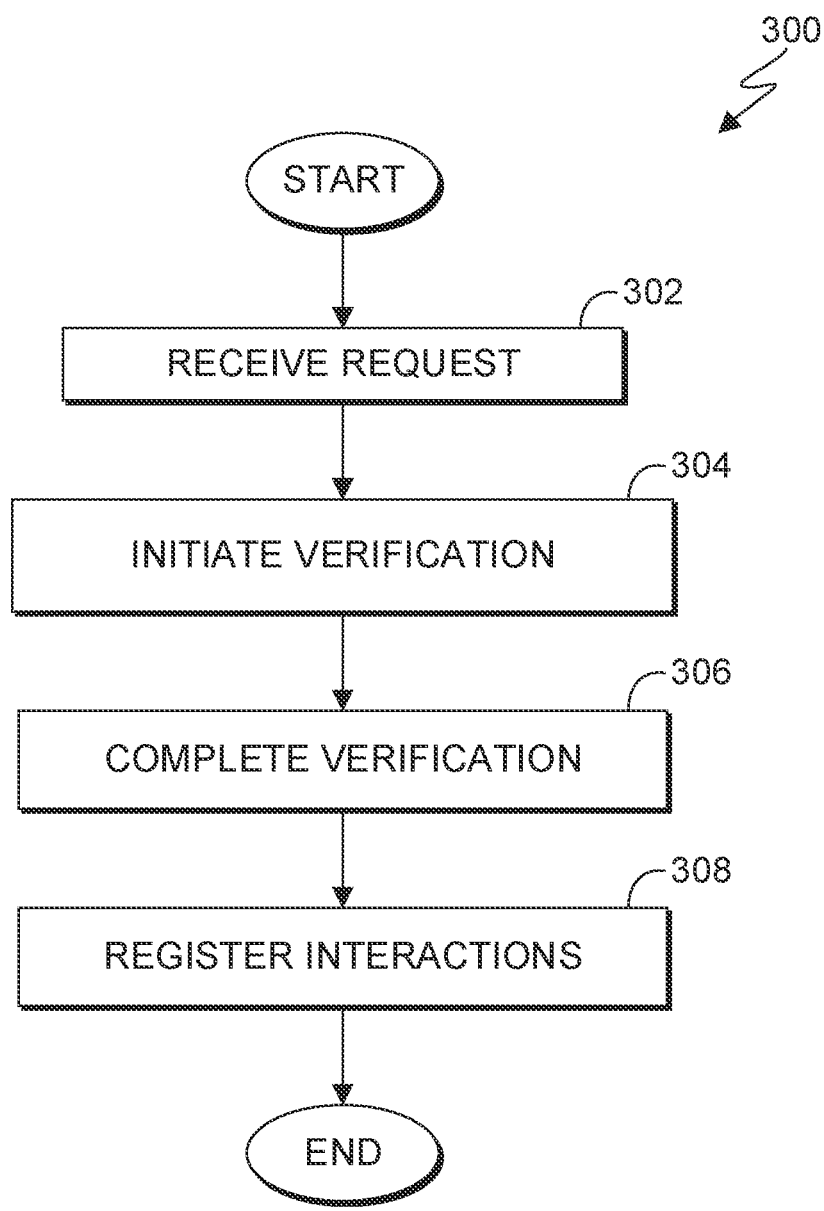
FIG. 3 is a flowchart depicting operational steps for verifying and processing a communication request, in accordance with an embodiment of the present invention.

FIG. 3 is a flowchart 300 for verifying and processing a communication request, in accordance with an embodiment of the present invention.

In step 302, communication manager 110 receives a request. In this embodiment, communication manager 110 receives a request to connect to a user device (e.g., user alpha requesting to connect to a device associated with user beta) via a request transmitted by a sending vendor (e.g., an application used by user alpha to place a call).

In step 304, communication manager 110 initiates verification. In response to receiving a request, communication manager 110 initiates a verification. In this embodiment, communication manager 110 initiates a verification by noting the linkage (e.g., between the sending vendor and the receiving vendor it is attempting to connect with) as part of the initial communication between the vendors to the extent that the originating callers can be identified by the sending vendor to the receiving vendor as a safe (i.e., trusted) source and via encryption at least the following information that should be shared: country of origin of the call, and the registered number of the originating caller. In situations where vendors are used to help connect (e.g., fly-over vendors), the handoff would not be noted, ultimately ensuring that the receiving vendor (e.g., connecting to the final user) received the sending vendors original signal and caller information. In other embodiments the verification can be performed by either communication manager 110 or the receiving vendor.

In this embodiment, communication manager 110 can use an Augmented Intelligence engine to sort and review incoming data packets among the incoming connection requests (e.g., received from step 302) from a source vendor as part of the verification process. In this way, connection manager 110 can identify and flag potential signs indicative of fraud (e.g., call spoofing, robocalling, etc.). For example, communication manager 110 can use the following to detect activity indicative of fraud: frequency of rate spikes, number of connection requests, increases in rate and frequency of number of unregistered (i.e., untrusted) user information, specific increases in rate and frequency from a single registered user, etc. In this embodiment either communication manager 110 or the receiving vendor can intercept such traffic and automatically block the connection for receiving users whose profile filter thresholds are not met.

If the sender has been flagged, communication manager 110 refuses to complete or otherwise process the request. In this way, the call will not be accepted (or otherwise will be refused) by the receiving vendor. Communication manager 110 then notates the request, the incomplete (e.g., blocked) processing, and corresponding device.

Regardless of the sending vendor's status as being trusted or untrusted (e.g., has not yet been verified as trusted) communication manager 110 manages or otherwise monitors receiving vendors for incoming connection requests. Additionally, communication manager 110 can notify the sending vendor and register that vendor within the chain as a potential source of call spoofing, robocalling, voice spam, etc. and reduce that vendor's validity (and therefore trust) in the public consensus chain.

In step 306, communication manager 110 completes verification. In this embodiment communication manager 110 can complete verification either by allowing a connection or preventing a connection based on either a successful or unsuccessful verification. In this embodiment, an allowed connection refers to processing the received request to connect to an end user's device.

Conversely, a prevented connection refers to an unsuccessful connection or a terminated connection request between a sending vendor and a receiving vendor. A successful or unsuccessful verification is based, at least in part, on any potential detected flags and previously identified user interaction as discussed above. In this embodiment, an unsuccessful verification can be triggered by a threshold number of negative user interactions or threshold number of detected flags. A user and/or a sending vendor can, after a successful and subsequently completed verification reach a threshold level of flags or negative user interactions and thus be prevented from future connection requests.

For example, in response to a successful verification (i.e., a communication manager 110 can, via the processing vendor perform the STIR/SHAKEN methodology verify the caller is registered with the correct private key (e.g., send all information in an encrypted manner), before the sending vendor even begins to establish a connection with the receiving vendor. Conversely, in response to an unsuccessful verification, communication manager 110 can prevent connection with the receiving vendor. In other embodiments, the receiving vendor can terminate a connection (i.e., communication) request in response to an unsuccessful verification.

In step 308, communication manager 110 registers interactions. In this embodiment, communication manager 110 can register interactions by generating a user interface depicting a reporting mechanism that is displayed on the end user device. Communication manager 110 can then register user interactions that indicate satisfaction. In this manner, communication manager 110 can (via user input) assign satisfaction values (e.g., user sentiment). In this embodiment, a numeric scale is used where greater numbers indicate higher levels of satisfaction while lesser number indicate lower levels of satisfaction (e.g., a satisfaction score of two on a scale from one to ten would indicate less satisfaction than a score of nine). In other embodiments, communication manager 110 can use a binary recording system recording either a positive or negative interaction. For example, a positive interaction denotes that the call successfully initiated, and that the interaction had was satisfied with the received and perhaps unexpected phone call upon completion. Conversely a negative interaction denotes that the user is unhappy or otherwise not satisfied because the user received an unsolicited and unwanted phone call.

Communication manager 110 can add and retain additional information to the chain such as call routing, known reports of usage, and more between vendors. For example, when a request to pass on a call is made, communication manager 110 references the public chain with regards to a sender's status within the chain. If the sender has been flagged, communication manager 110 refuses to complete or otherwise process the request. In this way, the call will not be accepted (or otherwise will be refused) by the receiving vendor. Communication manager 110 then notates the request, the incomplete (e.g., blocked) processing, the corresponding device, and in some embodiments, the user's unique identifier (e.g., username).

As mentioned above, communication manager 110 can then feed the assigned satisfaction values through a machine learning/training loop with regards to the receiving feedback pertaining to reporting a call. In this embodiment, user satisfaction/sentiment is recorded autonomously and subsequently added to a reporting value for a reporting transaction. In this manner, connection manager 110 can iteratively learn whether the system was utilized for a user's positive or negative outcome.

Figure 4:
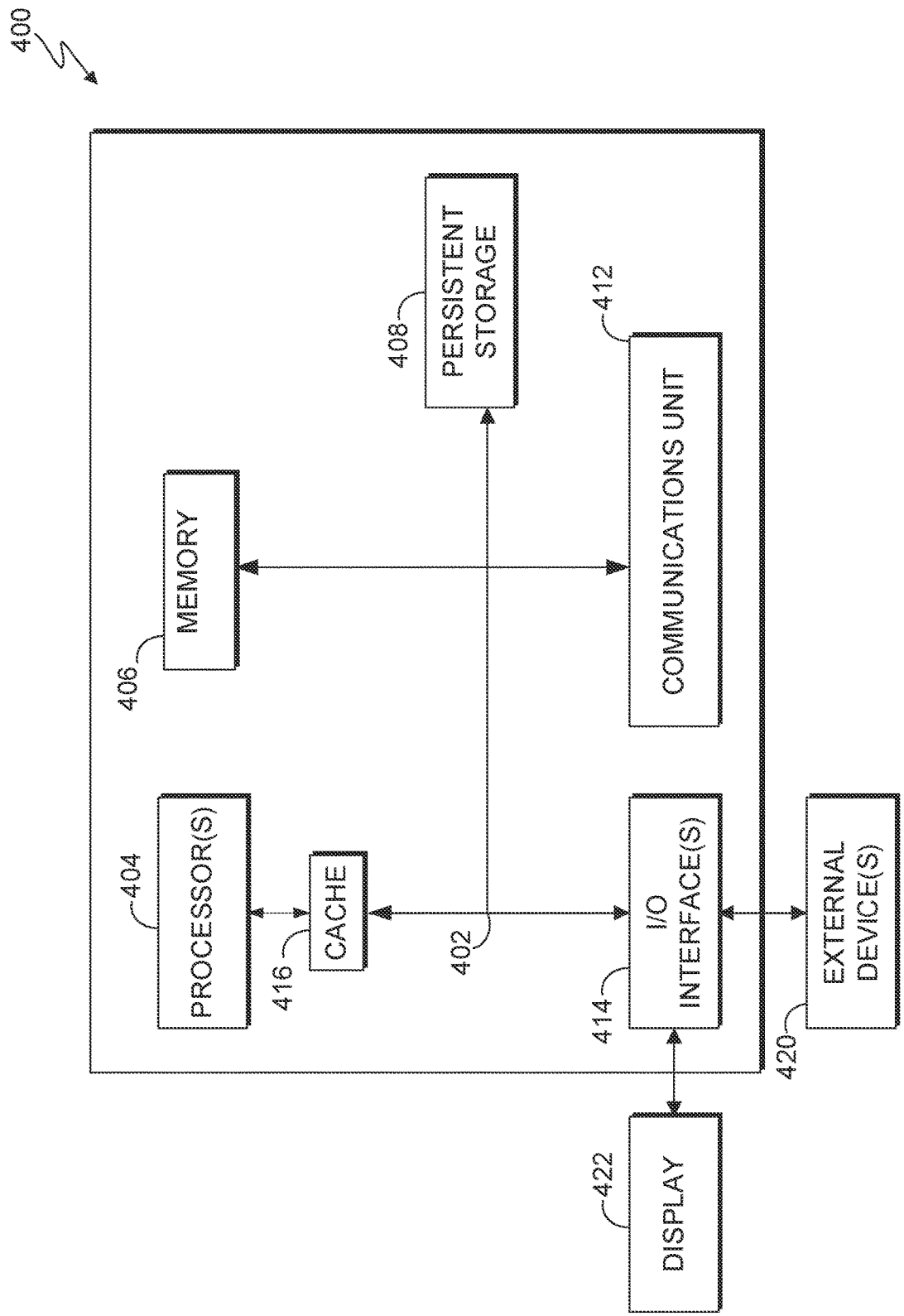
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Communication manager 110 (not shown) may be stored in persistent storage 408 and in memory 606 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Communication manager 110 may be downloaded to persistent storage 508 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., communication manager 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   creating an authentication mechanism for communication services utilizing a distributed recording system, wherein the authentication mechanism comprises a data structure that includes an instance of a private key for a respective receiver and a public key associated with a vendor structure that can be updated with each connection request;
   in response to receiving a request to connect with a device, utilizing the created authentication mechanism to connect with or prevent connection with the device; and
   creating a public immutable chain using the authentication mechanism by updating the data structure with each connection request that is kept separate from a private vendor user chain.

2. The computer-implemented method of claim 1, wherein creating an authentication mechanism for communication services utilizing a distributed recording system comprises:
   creating a private key for a respective receiver comprising user preferences;
   storing the created private key as part of a private vendor user chain; and
   managing call identification and call connection utilizing the distributed recording system as a foundation for truth verification.

3. The computer-implemented method of claim 1, further comprising:
   updating the created public immutable chain with each connection request to include device information of both a sending and requested receiving device, detected activity indicative of fraud, processing status of a respective connection request, and a respective receiving user's interaction.

4. The computer-implemented method of claim 1, further comprising:
   monitoring connection requests for activity of a sending vendor associated with a respective connection request for activity indicative of fraud; and
   in response to identifying activity indicative of fraud, updating the public immutable chain to notate the identified activity indicative of fraud is associated with the sending vendor.

5. The computer-implemented method of claim 1, further comprising:
   in response to an unsuccessful verification, preventing connection with the device; and
   updating a created public immutable chain comprising a data structure that includes information that identifies the connection request to the device, device information associated with the request, device information associated with the device, detected activity indicative of fraud, a processing status of a respective connection request, and a respective receiving user's interaction associated with the device.

6. A computer program product comprising:
   one or more computer readable storage media and program instructions stored on the one or more computer readable storage media, the program instructions comprising:
   program instructions to create an authentication mechanism for communication services utilizing a distributed recording system, wherein the authentication mechanism comprises a data structure that includes an instance of a private key for a respective receiver and a public key associated with a vendor structure that can be updated with each connection request;
   program instructions to, in response to receiving a request to connect with a device, utilize the created authentication mechanism to connect with or prevent connection with the device; and
   program instructions to create a public immutable chain using the authentication mechanism by updating the data structure with each connection request that is kept separate from a private vendor user chain.

7. The computer program product of claim 6, wherein the program instructions to create an authentication mechanism for communication services utilizing a distributed recording system comprises:
   program instructions to create a private key for a respective receiver comprising user preferences;
   program instructions to store the created private key as part of a private vendor user chain; and
   program instructions to manage call identification and call connection utilizing the distributed recording system as a foundation for truth verification.

8. The computer program product of claim 6, wherein the program instructions stored on the one or more computer readable storage media further comprise:
   program instructions to update the created public immutable chain with each connection request to include device information of both a sending and requested receiving device, detected activity indicative of fraud, processing status of a respective connection request, and a respective receiving user's interaction.

9. The computer program product of claim 6, wherein the program instructions stored on the one or more computer readable storage media further comprise:
   program instructions to monitor connection requests for activity of a sending vendor associated with a respective connection request for activity indicative of fraud; and
   program instructions to, in response to identifying activity indicative of fraud, update the public immutable chain to notate the identified activity indicative of fraud is associated with the sending vendor.

10. The computer program product of claim 6, wherein the program instructions stored on the one or more computer readable storage media further comprise:
    program instructions to, in response to an unsuccessful verification, prevent connection with the device; and
    program instructions to update a created public immutable chain comprising a data structure that includes information that identifies the connection request to the device, device information associated with the request, device information associated with the device, detected activity indicative of fraud, a processing status of a respective connection request, and a respective receiving user's interaction associated with the device.

11. A computer system comprising:
    one or more computer processors;
    one or more computer readable storage media; and
    program instructions stored on the one or more computer readable storage media for execution by at least one of the one or more computer processors, the program instructions comprising:
      program instructions to create an authentication mechanism for communication services utilizing a distributed recording system, wherein the authentication mechanism comprises a data structure that includes an instance of a private key for a respective receiver and a public key associated with a vendor structure that can be updated with each connection request;
      program instructions to, in response to receiving a request to connect with a device, utilize the created authentication mechanism to connect with or prevent connection with the device; and
      program instructions to create a public immutable chain using the authentication mechanism by updating the data structure with each connection request that is kept separate from a private vendor user chain.

12. The computer system of claim 11, wherein the program instructions to create an authentication mechanism for communication services utilizing a distributed recording system comprises:
    program instructions to create a private key for a respective receiver comprising user preferences;
    program instructions to store the created private key as part of a private vendor user chain; and
    program instructions to manage call identification and call connection utilizing the distributed recording system as a foundation for truth verification.

13. The computer system of claim 11, wherein the program instructions stored on the one or more computer readable storage media further comprise:
    program instructions to update the created public immutable chain with each connection request to include device information of both a sending and requested receiving device, detected activity indicative of fraud, processing status of a respective connection request, and a respective receiving user's interaction.

14. The computer system of claim 11, wherein the program instructions stored on the one or more computer readable storage media further comprise:
    program instructions to monitor connection requests for activity of a sending vendor associated with a respective connection request for activity indicative of fraud; and
    program instructions to, in response to identifying activity indicative of fraud, update the public immutable chain to notate the identified activity indicative of fraud is associated with the sending vendor.

\* \* \* \* \*